(12) United States Patent
Gaylo et al.

(10) Patent No.: US 9,774,193 B2
(45) Date of Patent: Sep. 26, 2017

(54) BATTERY CELL CHARGE BALANCING

(71) Applicant: Eetrex, Inc., Boulder, CO (US)

(72) Inventors: Andrew Gaylo, Westminster, CO (US); Dennis L. Potts, Boulder, CO (US)

(73) Assignee: Eetrex, Inc., Boulder, CO (US)

( * ) Notice: Subject to any disclaimer, the term of this patent is extended or adjusted under 35 U.S.C. 154(b) by 1125 days.

(21) Appl. No.: 13/661,645

(22) Filed: Oct. 26, 2012

(65) Prior Publication Data

US 2013/0106360 A1    May 2, 2013

Related U.S. Application Data

(60) Provisional application No. 61/551,770, filed on Oct. 26, 2011.

(51) Int. Cl.
*H02J 7/00* (2006.01)
*H01M 10/42* (2006.01)

(52) U.S. Cl.
CPC ....... *H02J 7/0016* (2013.01); *H01M 10/4207* (2013.01); *H02J 7/0013* (2013.01); *H01M 2010/4271* (2013.01); *Y02T 10/7055* (2013.01)

(58) Field of Classification Search
CPC .. H02J 7/0016; H02J 7/0013; G01R 31/3606; H01M 10/4207; H01M 2010/4271
USPC ................................. 320/126, 134
See application file for complete search history.

(56) References Cited

U.S. PATENT DOCUMENTS

| | | | |
|---|---|---|---|
| 7,508,166 B2* | 3/2009 | Ishikawa | H02J 7/0016 320/116 |
| 7,755,326 B1* | 7/2010 | Thivierge | B60L 3/0046 320/116 |
| 8,581,551 B2* | 11/2013 | Seo | G06F 1/26 320/101 |
| 2005/0024015 A1 | 2/2005 | Houldsworth et al. | |
| 2005/0242776 A1 | 11/2005 | Emori et al. | |
| 2008/0284380 A1 | 11/2008 | Chen et al. | |
| 2010/0261048 A1* | 10/2010 | Kim | H01M 10/44 429/150 |
| 2010/0264878 A1 | 10/2010 | Ueda et al. | |
| 2011/0074354 A1* | 3/2011 | Yano | H01M 10/441 320/116 |
| 2011/0279085 A1* | 11/2011 | Shigemizu | H01M 10/441 320/117 |
| 2013/0108898 A1 | 5/2013 | Potts et al. | |

* cited by examiner

*Primary Examiner* — Nathaniel Pelton
(74) *Attorney, Agent, or Firm* — Polsinelli PC

(57) ABSTRACT

A method and/or system for charge balancing across one or more modules or cells of a large battery system is described. In one embodiment to balance the modules, the battery management system may monitor the voltage output of the one or more modules of the battery system during recharging of the modules and compare the measured voltages to a set cutoff voltage. When one or more of the modules meets or exceeds the cutoff voltage, the battery system may activate an energy dissipating device associated with the one or more modules that meets or exceeds the cutoff voltage to reduce the voltage output from those modules below the cutoff voltage before the recharging signal is reapplied to the modules. Through multiple iterations of monitoring, charging and reducing the energy from the modules above the target, the SOC of each modules becomes balanced near or at the cutoff voltage.

9 Claims, 9 Drawing Sheets

BATTERY CELL CHARGE BALANCING

RELATED APPLICATIONS

This application claims priority to U.S. Provisional Application 61/551,770 to Gaylo et al, filed on Oct. 26, 2011, the entirety of which is incorporated herein by reference.

TECHNICAL FIELD

Aspects of the present disclosure generally relate a complex battery system. More particularly, aspects of the present disclosure relate to a method and/or system for balancing the state of charge of the batteries or cells of a modular battery system architecture.

BACKGROUND

Larger and evermore complex battery systems are being developed to provide larger voltages, more power, and larger capacity for modern uses, such as in electric vehicles, hybrid vehicles, home power supplies, and power storage for alternative energy generation platforms such as wind and solar. Such systems sometimes include several battery units interconnected in some manner to provide the large voltage and power. For example, complex battery systems may include several lower voltage battery packs that, when combined in series, provide a higher voltage.

In addition, battery units connected in series can generally only supply enough current as provided by the weakest module in the battery system. Thus, battery management systems have been developed to balance battery units connected in series of a battery system to maintain the modules as close to equal to provide the best performance. However, such balancing mechanisms in battery systems are generally wasteful of the potential energy and power provided by the system.

It is with these issues in mind, among others, that aspects of the present disclosure were conceived and developed.

SUMMARY

Aspects of the present disclosure involve a method for charge balancing an output for a plurality of modules of a battery system. The method includes the operations of receiving the voltage potential for each of the plurality of modules during a recharging of the plurality of modules and comparing the received voltage potentials to a predetermined initial cutoff voltage. The method further includes electrically connecting at least one energy dissipating device to at least one of the plurality of modules when the received voltage potential for the at least one module equals or exceeds the initial cutoff voltage and receiving the voltage potential for the at least one module during the application of the energy dissipating device. Finally, the method involves electrically disconnecting the at least one energy dissipating device when the received voltage potential for the at least one module is less than the initial cutoff voltage. Aspects of the present disclosure further include a battery charge management system including a controller with a a processing device configured to transmit and receive one or more control signals for configuring a battery system, a downstream communication link, and an upstream communication link. The system further including a sub-controller connected to the downstream communication link and the upstream communication link of the controller and further connected to a plurality of battery modules where the sub-controller is configured to receive one or more power unit control signals from the controller on the downstream communication link and, in response to the one or more power unit control signals received from the controller, balance the voltages of the plurality of battery modules by electrically connecting at least one energy dissipating device to at least one of the plurality of battery modules when the voltage for the at least one module equals or exceeds an initial cutoff voltage.

DETAILED DESCRIPTION

Aspects of the present disclosure involve a method and/or system for charge balancing across one or more modules or cells of a large battery system. In one embodiment to balance the modules, the battery system may monitor the voltage output of the one or more modules of the battery system during recharging of the modules and compare the measured voltages to a set cutoff voltage. When one or more of the modules meets or exceeds the cutoff voltage, the battery system may activate an energy dissipating device associated with the one or more modules that meets or exceeds the cutoff voltage to reduce the voltage output from those modules below the cutoff voltage before the recharging signal is reapplied to the modules. Through multiple iterations of monitoring, charging and reducing the energy from the modules above the target, the SOC of each module becomes balanced near or at the cutoff voltage.

In another embodiment of the charge balancing method, the cutoff voltage (sometimes referred to herein as "the target voltage") may be adjusted during one or more of the iterations described above. Thus, the cutoff voltage may be adjusted during a first iteration of the balancing method described above such that the number of modules that have an energy dissipating device utilized to lower the voltage output of the module increases. In this embodiment, the cutoff voltage is adjusted between the maximum measured voltage and the minimum measured voltage of the modules to reduce the number of iterations the method is performed to balance the modules. This embodiment may thus achieve the charge balancing of the modules sooner than the embodiment described above, resulting in less energy wasted by the battery system to balance the modules.

Figure 1:
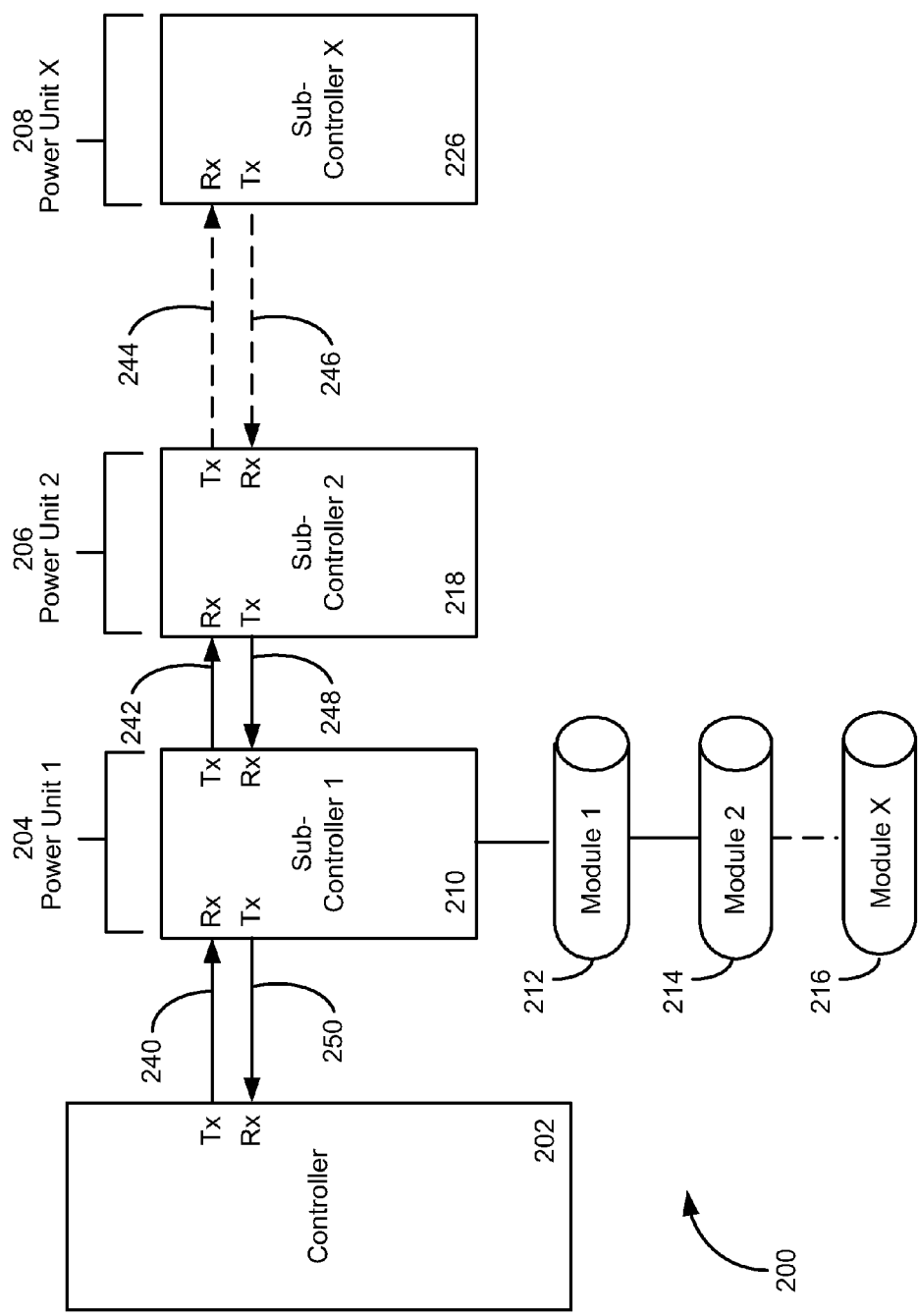
FIG. 1 is a block diagram illustrating an exemplary complex battery system architecture that may be utilized to balance a cell charge of the battery units of the battery system.

FIG. 1 is a block diagram illustrating an exemplary communication complex battery system architecture configured to balance the cell charge of the battery units of the battery system. The battery system 200 shown may be used in any environment or device where a large voltage, stored electricity or power is needed. For example, the battery system shown may be utilized in a hybrid vehicle, or an electric vehicle, or as a power supply for a residence. In another example, the battery system may be used to provide back-up power for one or more devices in data center. In general, any battery system control architecture that utilizes a controller to control and/or monitor one or more aspects of the modules of the battery system may be utilized to implement the methods and/or systems described herein to perform battery cell charge balancing of the battery system. One particular example of such a battery system architecture is disclosed in related U.S. patent application Ser. No. 13/661,504, title "MODULAR BATTERY CONTROL SYSTEM ARCHITECTURE" filed concurrently and incorporated in its entirety by reference herein.

The battery system 200 of FIG. 1 includes a controller 202 electrically connected to one of the one or more power units 204-208. In one embodiment, the controller 202 may be included as part of the battery system 200 for interfacing with the device or devices to be powered by the battery system or to otherwise receive or deliver electrical energy from the battery. In another embodiment, the controller 202 is integrated into the powered device or some other external component. For example, the controller 202 may be a main controller of a hybrid car such that the power units 202-208 may be connected to the existing controller 202 upon installation of the battery in the hybrid car, and the battery provides motive energy to the electric motor on demand and receives energy during regenerative braking and charging. The battery may also receive or deliver energy in vehicle-to-grid applications or other similar applications.

Regardless of whether the controller 202 is included as part of the battery or connected to the controller upon installation in the powered device, the controller may provide the general instructions and control signals for managing the various modules and components of the battery system. Further, the controller 202 may also receive signals from the components of the battery system for utilization during operation of the battery system, such as information about the performance of the modules or components of the battery system.

As also shown in FIG. 1, the power unit 204 may include a sub-controller 210 electrically connected to one or more battery modules 212-216. In one embodiment, the battery modules 212-216 are connected in series to the sub-controller 210. Thus, in power unit 1 (204), battery module 1 (212) is connected to the sub-controller 1 210, battery module 2 (214) is connected to battery module 1 (212) and so on to battery module X (216), designated as such to illustrate that any number of battery modules may be connected in the serial connection. In this manner, each power unit 204-208 may include any number of battery modules as needed to provide the desired voltage and power for the particular power unit. Further still, each battery module within each power unit 204-208 may include any number of cells. For example, battery modules 1 (212)-X (216) of power unit 1 (204) may each include six battery cells (not shown), although other cell numbers are possible. Thus, although shown in FIG. 1 as a single module, each module of the battery system may include any number of batteries or cells. In general, the battery modules 212-216 of any power unit 204-208 may be connected in any manner to provide the power unit with the desired voltage, power, current charge or discharge capacity and/or storage capacity, or other characteristics.

As mentioned, the controller 202 may be in electrical communication with one of the one or more power units 204-208. As shown in FIG. 1, the controller 202 is connected to a first power unit of a plurality of serially connected power units, designated in FIG. 1 as power unit 1 (204). More particularly, the controller 202 is electrically connected to the sub-controller 210 of the first power unit 204. The controller 202 may be connected to the sub-controller 210 of the first power unit 104 through any known means for communicating electrically, including wired or wireless communication.

In one embodiment, a second power unit, power unit 2 (206), is connected to the first power unit 204 in a similar manner to the connection between the controller 202 and the first power unit 204. More particularly, the sub-controller 218 of power unit 2 (206) is in electrical communication with the sub-controller 210 of power unit 1 (204). In another embodiment, power unit 2 (206) is connected directly to the controller 202 in a similar manner as power unit 1 (204) such that power unit 2 communicates directly with the controller. In this manner, any number of power units 204-208 may be connected in the battery system 200. This is illustrated in FIG. 1 as the connection of power unit X (208) in the serial chain of the connected power units. Power unit X (208) represents the last power unit in the serial chain of power units of the any number of connected units.

Utilizing the above described configurations and techniques for the battery system, the controller may transmit one or more commands to the sub-controllers to balance the cells and/or modules of the battery to protect the battery system and achieve greater performance. For example, battery systems composed of one or many cells may only supply enough current as the weakest module. In addition, battery systems may be damaged or become dangerous when the battery cells are over-discharged or over-charged passed the specifications of the battery cells. Further, a full charge and discharge of the battery cells can increase the battery cell life cycle. To address this, the battery management systems described herein may balance the battery modules so they remain as close to equal as possible to provide the best performance.

Figure 2:
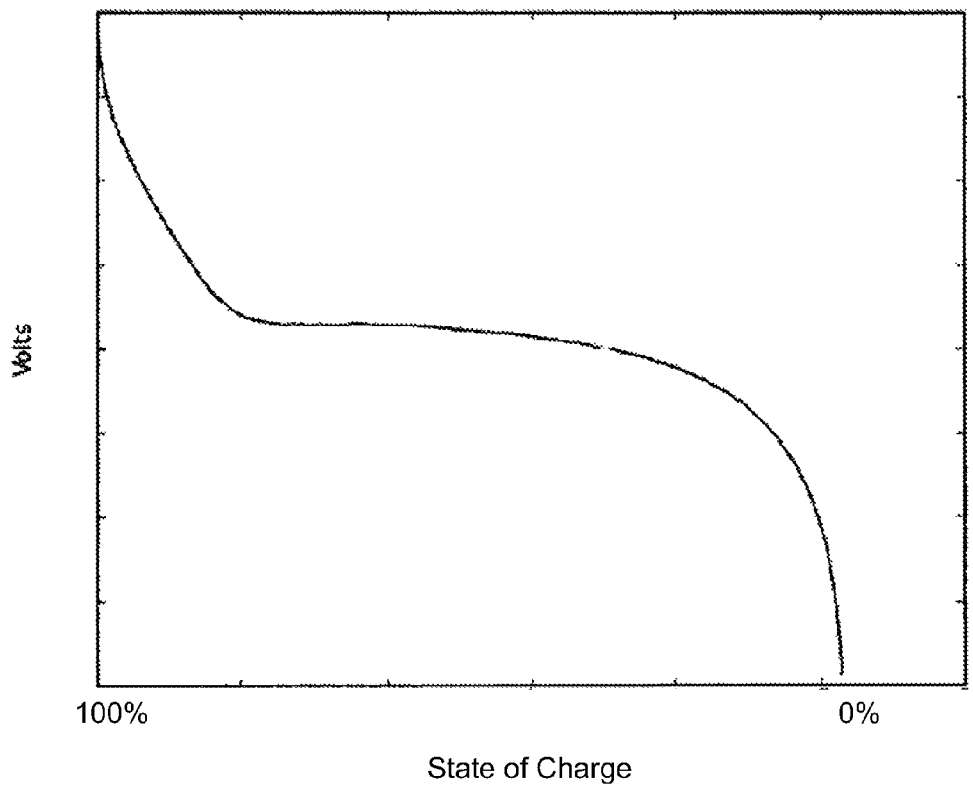
FIG. 2 is a graph of the state of charge versus the output voltage of a typical battery.

For example, FIG. 2 is a graph of the voltage measurement of a typical battery over the charge cycle of the battery from full on the left side of the graph to discharged on the right side. However, as depicted in the graph, when the state of charge of a battery reaches the top 5-10% of total state of charge, the voltage of the battery approaches a linear scale. Thus, as the battery approaches 100% state of charge, the battery is in danger of becoming over-charged and being damaged. Similarly, the battery may become damaged near the bottom of the state of charge. Thus, it may be beneficial to provide to keep the state of charge of any battery within the relatively flat section of the curve shown in the graph of FIG. 2 to retain a longer battery cell life cycle. As such, management of the state of charge (SOC) of the modules of the battery system may increase the longevity and performance of the cells including within the battery system, as well as providing a more reliable power signal.

Figure 3:
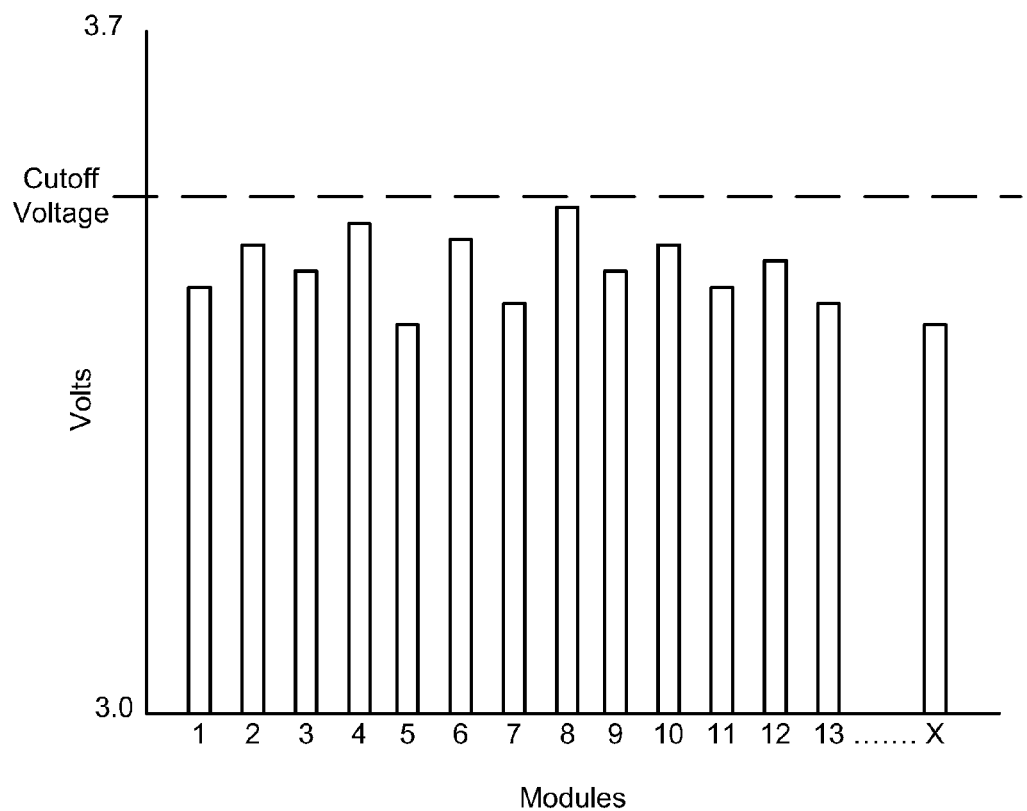
FIG. 3 is a bar graph of the voltage output of a plurality of modules of a battery system prior to applying a balancing feature to the modules.

One method that may be used to balance the modules of a battery system, referred to as "dissipative cell balancing", is provided herein. Dissipative cell balancing involves charging each cell or module in the battery system to increase the voltage output for each module and then removing energy from the cells or modules that meet or exceed a target voltage output. For example, FIG. 3 illustrates a bar graph of the output voltages of several modules of a battery system. The modules shown in FIG. 3 are akin to the modules 212-216 of the battery system of FIG. 1. Thus, module 1 in FIG. 3 may represent Module 1 (212) associated with power unit 1 (204) of FIG. 1. Similarly, modules 2-X represent Module 2 through Module X associated with power unit 1 (204) of FIG. 1. Thus, the graph of FIG. 3 is a graph of the SOC (or more accurately, output voltage level) for each module of power unit 1 (204) of FIG. 1. Similar graphs may also represent voltage outputs for power unit 2 (206) through power unit X (208), depending on the number of components and composition of the battery system being balanced.

As shown in FIG. 3, the modules of the battery system may provide varying amount of output voltage. For example, the voltage provided by module 1 is less than that of module 2, while the output voltage of module 4 is greater than that of both module 1 and module 2. Such variance in output voltage may be a result of use of the battery system to provide power to a device. However, as discussed above, it may be desirous to have each module of the system to have the same or similar SOC to increase the longevity of the battery system. To accomplish this, the battery system may perform a charge balancing of each module to attempt to level the voltages provided by each module of the system at the top of the SOC curve. However, the output voltage for each module may be maintained below a particular voltage to prevent damaging the module by overcharging, as explained above. For example, it may be desirous to only recharge each module to 70% SOC to prevent any one module from entering an overcharged state. As such, the battery system may determine a cutoff voltage that ensures that any module receiving a charge does not become overcharged and damaged. In general, the cutoff voltage may be set at any voltage value to prevent damage to the modules and, thus, may be dependent on the chemical and physical properties of the module or modules being recharged. In one embodiment, the battery system controller is programmed with or otherwise determines the cutoff voltage used to prevent the modules from being overcharged and is provided to each power unit of the battery system as a portion of the charge balancing command. In some instances, the cutoff voltage is referred to herein as the "target voltage" as it is a goal of the balancing methods to charge each module such that the output voltage of each module is at or near the cutoff voltage.

Returning to FIG. 3, a cutoff voltage for one example is shown on the bar graph. In this instance, the cutoff voltage is set at 3.5 volts. To begin balancing the modules, the battery system may provide a charge to each module represented to recharge each module. Such a recharging signal may be applied to the battery system by plugging the battery into an outlet or other interface electrically connected to an energy grid, such as a recharging station associated with a parking space or in a user's home garage. As the modules are recharged, the battery system may monitor the output voltage of each module and such information may be analyzed by the battery system. For example, the controller may request performance information from each BMS sub-controller connected to the controller to receive voltage or energy capacity output information from each module of the system. This information may contain performance statistics for the modules or cells associated with the BMS sub-controllers such that the voltage output of each module may be monitored by the system.

Figure 4:
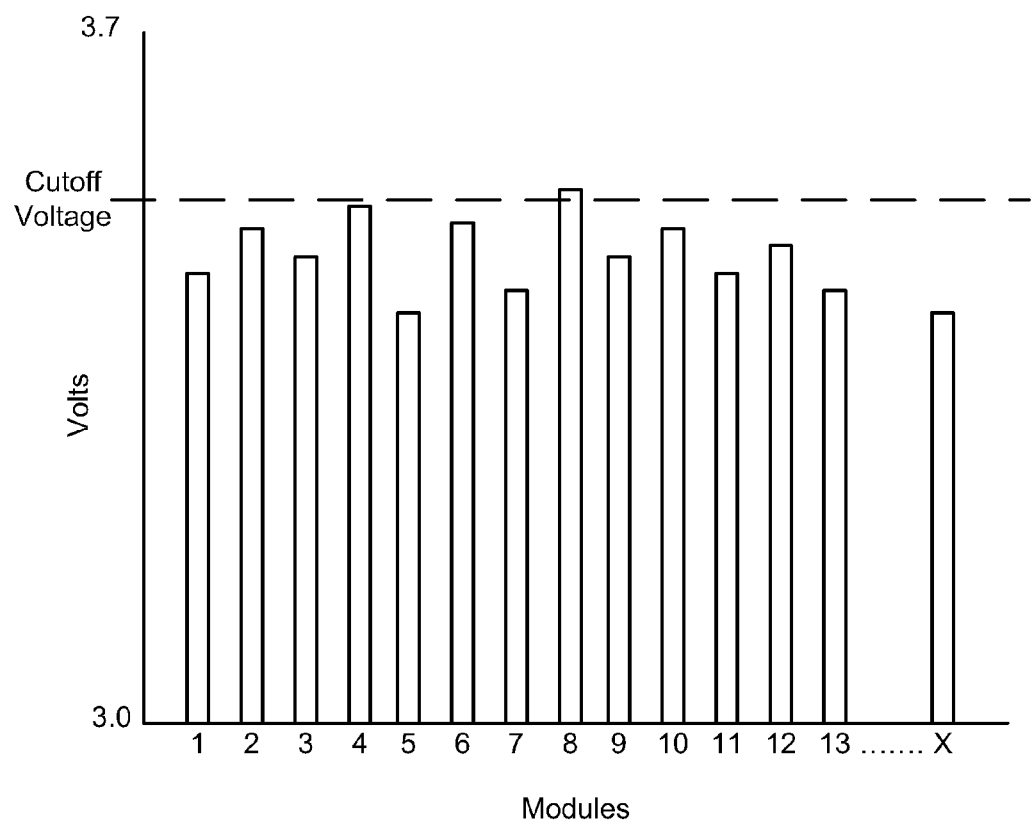
FIG. 4 is a bar graph of the voltage output of the plurality of modules of the battery system after a recharging signal is applied to the modules.

As shown in the bar graph of FIG. 4, the output voltage for each module that is recharged increases as the recharging signal is applied to the modules. However, as the output voltages increase, one or more modules may be increased above the preset cutoff voltage, such as module 8 of FIG. 4. As such, module 8 is in danger of becoming overcharged and damaged. In response to the output voltage exceeding the cutoff voltage, the battery system may begin removing energy from each cell or module that equals or is more than the cutoff voltage. In one embodiment, the battery system may apply a resistor or other energy dissipating device across the one or more modules that exceed the cutoff voltage for a segment of time to reduce the output voltage for those modules. The energy dissipating device may be applied until the voltage of the module reaches or is below the cutoff voltage. Additionally, the recharging signal to each module may also be removed for the period of time that the output voltage is being reduced.

Figure 5:
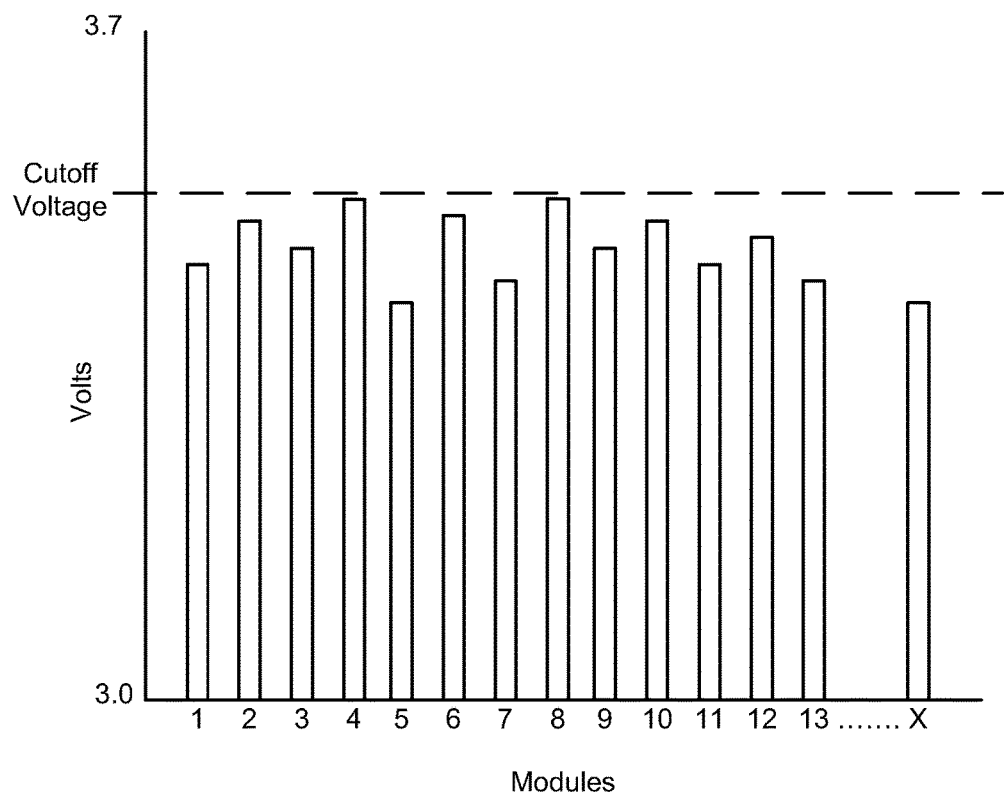
FIG. 5 is a bar graph of the voltage output of the plurality of modules of the battery system after an energy dissipating device is applied to one of the modules exceeding a cutoff voltage.
Figure 6:
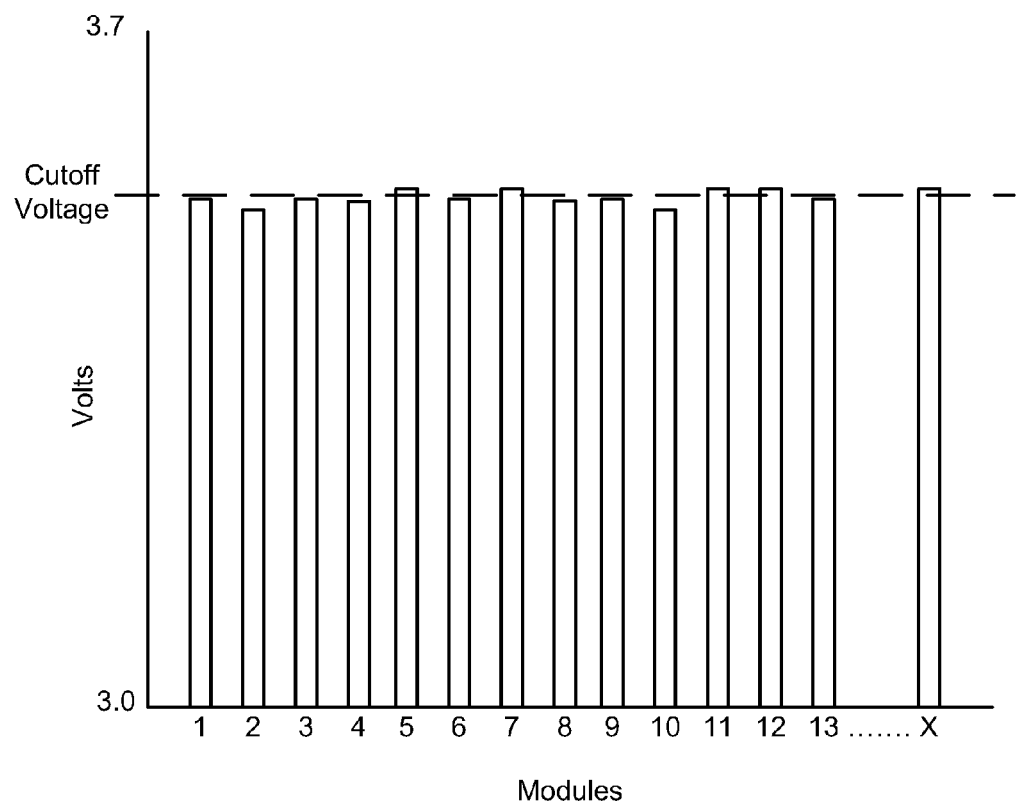
FIG. 6 is a bar graph of the voltage output of the plurality of modules of the battery system after the modules have been balanced.

Once the measured output voltage of module 8 (or any other module measured above the cutoff voltage) drops below the cutoff voltage (as shown in FIG. 5), the energy dissipating device may be electrically removed from the module and the recharging signal may be returned to recharge each module. As the recharging signal is applied, the voltage output of each module increases until one or more modules are again measured as having a voltage output above the cutoff voltage. For instance, as the recharge signal is applied to the modules of FIG. 5, the voltage output for module 8 and module 4 may be measured above the cutoff voltage. Thus, similar to the operations above, the recharging signal may again be removed and an energy dissipating device may be applied across the modules 4 and 8 for a segment of time until the voltage of the modules reach or are below the cutoff voltage. In this manner, through multiple iterations of monitoring, recharging and reducing the energy from the modules above the cutoff voltage, the output voltage of each module becomes balanced, as shown in FIG. 6.

To perform this charge balancing, the battery system may utilize the structures and methods described above. For example, returning to FIG. 1, the controller 202 may begin a charge balancing routine to balance the cells/modules of the battery system. The controller 202 may provide an instruction to the power units 204-208 connected to the controller instructing the power units to perform the balancing routine. More particularly, the controller 202 may transmit the instruction to sub-controller 1 210 of the first power unit. In turn, sub-controller 1 210 may transmit or propagate the balancing instruction to sub-controller 2 218, and so forth down the serial connection of power units. An acknowledgement message may be transmitted from each sub-controller back to the controller 202 to acknowledge receipt of the balancing command. In addition, the balancing command may include the target state of charge for each module or cell within the battery system. Upon receipt of the balancing command, the sub-controllers may perform the balancing routine as described above for the modules and cells associated with that sub-controller by activating energy dissipating devices for those cells above the target state of charge. For example, the sub-controller may provide a signal to close a switch to connect a resistor across the cell for a particular amount of time to remove energy from the cell.

In addition, the controller 202 may request performance information from each sub-controller connected to the controller. This information may contain performance statistics for the modules or cells associated with the sub-controllers. Based on this information, the controller 202 may then issue balancing instructions specifically targeted toward a sub-controller or even a module or cell associated with a sub-controller of the battery system. The sub-controller may perform the requested balancing by activating an energy dissipating device for the cell or module in question. In this manner, the controller 202 may control the balancing operation to balance the output of the connected batteries.

Further, in some embodiments, the voltage output of the one or more modules that exceed the cutoff voltage may be reduced by redirecting voltage from the modules exceeding the cutoff to those modules that are below the cutoff voltage. Thus, rather than connecting an energy dissipating device to reduce the measured voltage of the module as described above, the battery system may connect the module to a master bus to drain voltage from the module exceeding the cutoff voltage. This energy may, in turn, be provided to one or more modules with a voltage below the cutoff voltage to recharge those modules. As such, in this embodiment, the energy drained from one module may be used to recharge another module to reduce the voltage wasted by the battery system during balancing.

Figure 7:
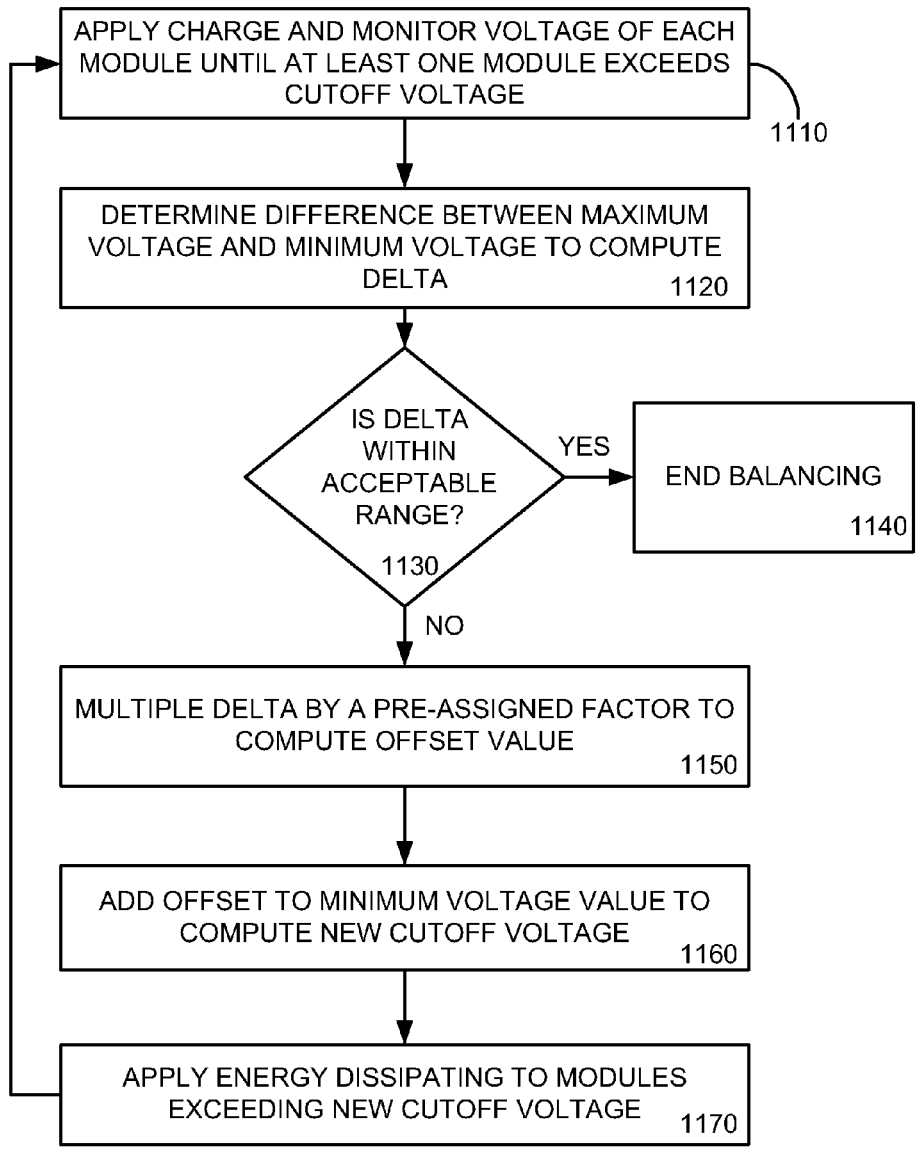
FIG. 7 is a flow chart illustrating an alternate embodiment of a balancing method to balance the voltage output of a plurality of modules of a battery system.

Reduction of the energy wasted during balancing of the modules of the battery system may also be reduced by actively adjusting the cutoff voltage during balancing, such as through the charge balancing method shown in FIG. 7. More particularly, the cutoff voltage may be adjusted between the maximum measured voltage and the minimum measured voltage of the modules to reduce the number of iterations performed to achieve balancing the modules. Beginning in operation 1110, the controller of the battery system applies the recharging signal to the modules of the battery in a similar manner as described above. Additionally, the controller may monitor the output voltage or SOC of each module to determine when one or more modules exceed a set cutoff voltage. Operation 1110 is thus similar to the operations of the passive balancing described above.

Figure 8:
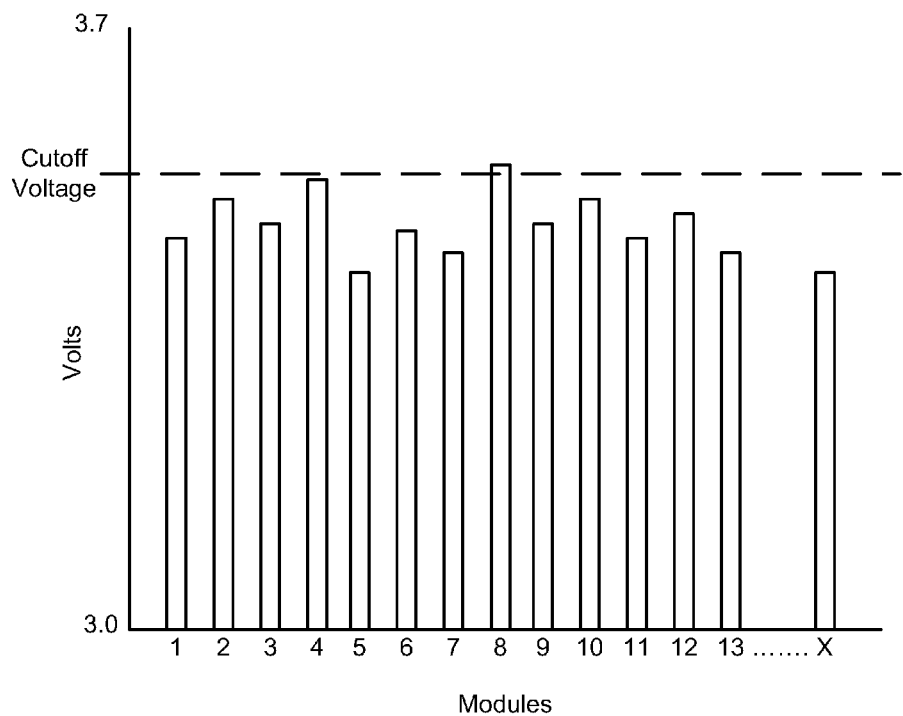
FIG. 8 is a bar graph of the voltage output of the plurality of modules of a battery system illustrating the voltage of one module exceeding a cutoff voltage.

The controller performs operation 1120 when the voltage of at least module meets or exceeds the cutoff voltage as monitored in operation 1110. In operation 1120, the controller receives or otherwise determines the module with the maximum output voltage and the module with the minimum output voltage. For example, for the battery system depicted in the bar graph of FIG. 8, module 8 has the highest output voltage while module 5 has the lowest output voltage. The controller also determines the output voltage for these modules. The controller may then calculate the difference between the highest measured output voltage and the lowest measured output voltage. This difference is set as the voltage delta. In the example of FIG. 8, the output voltage of module 8 equals 3.420 volts while the output voltage of module 5 equals 3.320 volts, resulting in a calculated voltage delta as 0.100 volts in operation 1120.

In operation 1130, the controller determines if the calculated voltage delta is within an acceptable tolerance range for the battery system. In general, the battery system may be programmed with an acceptable tolerance for the difference in output voltages of the modules to indicate when to cease the charge balancing. Thus, if the voltage delta is within the acceptable tolerance, the battery system may then perform operation 1140 and cease the charge balancing until a new balancing command is received from the controller. However, if the voltage delta is not within the acceptable range as determined in operation 1130, the controller may then perform operation 1150.

In operation 1150, the calculated voltage delta is multiplied by a pre-assigned factor to compute an offset value. In one example, the voltage delta may be multiplied by 0.75 (or 75%) to calculate the offset value. As explained in more detail below, the factor determines the where cutoff voltage is set between the maximum measured voltage and the minimum measured voltage. In general, the factor value may be any numerical value between zero and one and may be stored in any computer-readable medium of the battery system or the device that is powered by the battery system. Applying a factor of 0.75 to the calculated voltage delta in the above example results in an offset value equal to 0.75*0.100 volts, or 0.075 volts.

Figure 9:
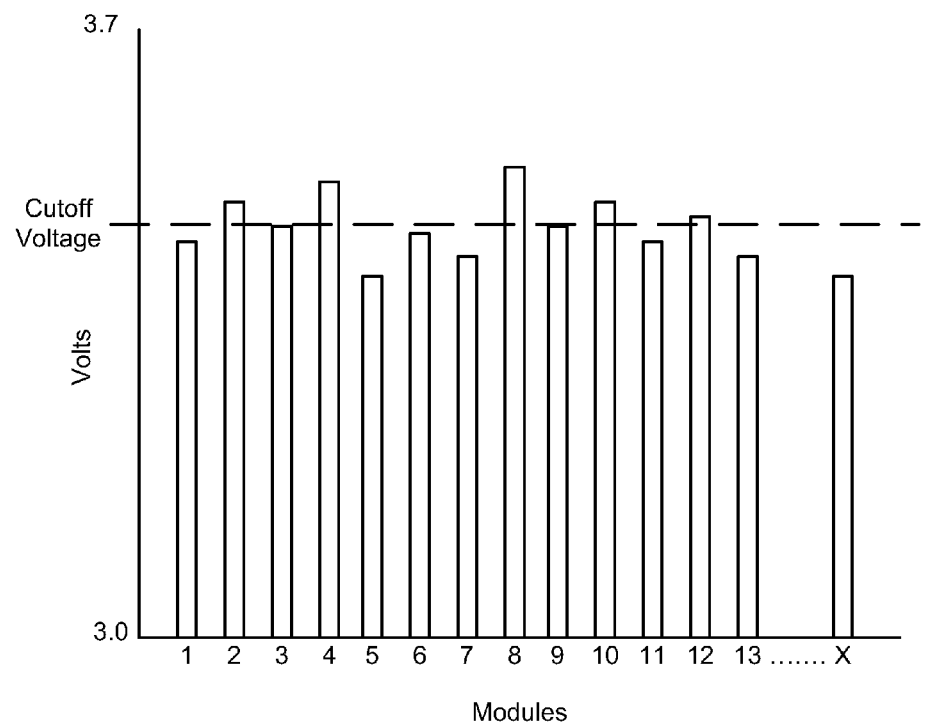
FIG. 9 is a bar graph of the voltage output of the plurality of modules of the battery system illustrating the reduction of the cutoff voltage resulting from the alternate embodiment of a balancing method of FIG. 7.

The controller then adds, in operation 1160, the calculated offset value to the minimum voltage value determined in operation 1120 to compute a new cutoff voltage value. Continuing the above example, the calculated offset value of 0.075 volts is added to the minimum measured output voltage of the modules (3.320 volts), resulting in a new cutoff voltage value of 3.395 volts. This new cutoff voltage value is illustrated in the bar graph of FIG. 9 in comparison to bar graph of FIG. 8. As should be appreciated, the new cutoff voltage value is less than the initial cutoff voltage illustrated in FIG. 8, such that the measured output voltage of a plurality of modules now exceed the new cutoff voltage value as compared to the initial cutoff voltage. More particularly as shown in FIG. 9, modules 2, 4, 8, 10 and 12 exceed the new cutoff voltage. Thus, the balancing method has increased the number of modules that exceed the cutoff voltage before any energy dissipating or voltage reduction has occurred by lowering the cutoff voltage. The controller may then apply an energy dissipating device to those modules exceeding the new cutoff value in operation 1170 to reduce the output voltages of those modules. Once the output voltage of each module is below the new cutoff voltage value, the controller returns to operation 1110 and repeats the balancing method of FIG. 7.

As shown, the balancing method of FIG. 7 reduces the cutoff voltage value during the balancing operations. In this manner, the balancing of the output voltage of the modules may be performed faster than the passive balancing explained above as the cutoff voltage value is adjusted to lie within the range of maximum voltage and minimum voltage measured. As such, the initial cutoff voltage value may be set closer to the overcharged value of the modules as the voltage that the modules are eventually balanced to will be lower than the initial cutoff voltage. Also, the balancing method illustrated in FIG. 7 allows the controller of the battery system to control how close to the maximum measured output voltage the modules are balanced to by the balancing method. In general, the higher the assigned factor number, the closer the new cutoff voltage is to the maximum output voltage and, subsequently, the output voltage to which the modules of the system will be balanced. Alternatively, the lower the assigned factor number, the closer the new cutoff voltage is to the minimum measured output voltage and, subsequently, the output voltage to which the modules of the system will be balanced. Thus, with each iteration of the method shown in FIG. 7, the controller or battery system may adjust the cutoff voltage to guide the output voltage of the modules to be balanced near the maximum or minimum output voltage, as desired. In some embodiments, this factor may be set in response to one or more operational measurements of the battery system received by the controller, such as current load and charging signal, among others.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the disclosure. Accordingly, the proper scope of the disclosure is defined by the appended claims. The various embodiments, operations, components and configurations disclosed herein are generally exemplary rather than limiting in scope.

What is claimed is:

1. A method for balancing an output for a plurality of modules of a battery system, the method comprising:
   receiving the voltage potential for each of the plurality of modules during a recharging of the plurality of modules;
   comparing the received voltage potentials to a predetermined initial cutoff voltage;
   calculating a voltage difference between a maximum voltage potential of the received voltage potentials and a minimum voltage potential of the received voltage potentials;
   multiplying the calculated voltage difference by a pre-assigned factor to compute an offset value, wherein the pre-assigned factor is a non-integer percentage related to the difference to the maximum module potential to the minimum module potential;
   calculating a new cutoff voltage based on the multiplied voltage difference and the pre-assigned factor, the new cutoff voltage being less than the initial cutoff voltage by the offset value;
   electrically connecting at least one energy dissipating device to at least one of the plurality of modules when the received voltage potential for the at least one module equals or exceeds the new cutoff voltage;
   receiving the voltage potential for the at least one module during the application of the energy dissipating device; and
   electrically disconnecting the at least one energy dissipating device when the received voltage potential for the at least one module is less than the new cutoff voltage.

2. The method of claim 1 further comprising:
   comparing the calculated voltage difference to a predetermined tolerance value; and
   ceasing recharging of the plurality of modules when the calculated voltage difference is less than or equal to the predetermined tolerance value.

3. The method of claim 1 further comprising:
   receiving a balancing command from a controller on a communication link at a first management control sub-controller associated with the plurality of modules;
   receiving at least one performance indicator from each of the plurality of modules; and
   storing the at least one performance indicator of the first power unit in a computer-readable storage device associated with the first management control sub-controller.

4. The method of claim 1 wherein the energy dissipating device is a resistor that, when electrically connected to the at least one of the plurality of modules, reduces the potential voltage of the at least one of the plurality of modules.

5. The method of claim 1 wherein electrically connecting at least one energy dissipating device to at least one of the plurality of modules comprises removing potential voltage from the at least one of the plurality of modules and providing the potential voltage to a voltage bus.

6. A battery management system comprising:
   a controller comprising:
      a processing device configured to transmit and receive one or more control signals for configuring a battery system;
      a downstream communication link; and
      an upstream communication link; and
   a sub-controller connected to the downstream communication link and the upstream communication link of the controller and further connected to a plurality of battery modules, wherein the sub-controller is configured to receive one or more power unit control signals from the controller on the downstream communication link and, in response to the one or more power unit control signals received from the controller, wherein the controller performs the operations of:
      receiving the voltage levels for each of the plurality of battery modules;
      comparing the received voltage levels to a predetermined initial cutoff voltage;
      calculating a voltage difference between a maximum voltage potential of the received voltage potentials and a minimum voltage potential of the received voltage potentials;
      multiplying the calculated voltage difference by a pre-assigned factor to compute an offset value, wherein the pre-assigned factor is a non-integer percentage related to the difference to the maximum module potential to the minimum module potential;
      calculating a new cutoff voltage based on the multiplied voltage difference and the pre-assigned factor, the new cutoff voltage being less than the initial cutoff voltage by the offset value;
      transmitting a first power unit control signal to the sub-controller to electrically connect at least one energy dissipating device to at least one of the plurality of battery modules when the received voltage level for the at least one module equals or exceeds the new cutoff voltage;
      receiving the voltage levels for the at least one module during the application of the energy dissipating device; and
      transmitting a second power unit control signal to the sub-controller to electrically disconnect the at least one energy dissipating device when the received voltage potential for the at least one module is less than the new cutoff voltage.

7. The battery management system of claim 6 wherein the sub-controller further comprises:
   a processing device configured to receive voltage levels of the plurality of battery modules; and
   a computer-readable storage device configured to store the voltage levels of the plurality of battery modules.

8. The battery management system of claim 7 wherein, in response to the one or more power unit control signals received from the controller, the processing device operates to transmit the stored voltage levels to the controller on the upstream link.

9. The battery management system of claim 6 wherein the controller further performs the operations of:
   transmitting a plurality of power unit control signals to the sub-controller to electrically connect the least one energy dissipating device to the least one of the plurality of battery modules when the received voltage level for the at least one battery module equals the new cutoff voltage.

* * * * *